United States Patent
Chida

(10) Patent No.: US 9,684,945 B2
(45) Date of Patent: Jun. 20, 2017

(54) IMAGE PROCESSING APPARATUS AND IMAGE PROCESSING METHOD FOR TRANSFERRING IMAGE DATA

(71) Applicant: CANON KABUSHIKI KAISHA, Tokyo (JP)

(72) Inventor: Hiromasa Chida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 14/598,355

(22) Filed: Jan. 16, 2015

(65) Prior Publication Data

US 2015/0213574 A1    Jul. 30, 2015

(30) Foreign Application Priority Data

Jan. 28, 2014   (JP) ................................. 2014-013640

(51) Int. Cl.
*G06T 1/60*    (2006.01)
*G06F 12/00*   (2006.01)

(52) U.S. Cl.
CPC ................ *G06T 1/60* (2013.01); *G06F 12/00* (2013.01)

(58) Field of Classification Search
None
See application file for complete search history.

(56) References Cited

U.S. PATENT DOCUMENTS

2002/0154823 A1\* 10/2002 Okada .................. H04N 19/172
                                                    382/233
2008/0056017 A1\* 3/2008 Suzuki ..................... G11C 7/02
                                                    365/189.05

FOREIGN PATENT DOCUMENTS

JP    2008-059449 A    3/2008

\* cited by examiner

*Primary Examiner* — Kee M Tung
*Assistant Examiner* — Yanna Wu
(74) *Attorney, Agent, or Firm* — Carter, DeLuca, Farrell & Schmidt, LLP

(57) ABSTRACT

The order of the respective elements constituting image data is changed according to an order specified by a designated operation mode. The resultant data are transferred to a memory in a predetermined transfer unit. The respective elements constituting the data transferred to the memory are then processed after changing to the order before changing the order according to the above order.

10 Claims, 7 Drawing Sheets

| | BURST DATA 0 | BURST DATA 1 | BURST DATA 2 | BURST DATA 3 | BURST DATA 4 | BURST DATA 5 | BURST DATA 6 | BURST DATA 7 | TRANSITION COUNT |
|---|---|---|---|---|---|---|---|---|---|
| ORDER CHANGING TABLE 0 | 000000FF | F000000F | FF000000 | FFF00000 | 0FFF0000 | 00FFF000 | 000FFF00 | 0000FFF0 | 52 BITS |
| ORDER CHANGING TABLE 1 | FFE00000 | FFE00000 | FFE00000 | FFE00000 | FFE00000 | FFE00000 | FFE00000 | FFE00000 | 0 BIT |
| JAPANESE PATENT LAID-OPEN NO.2008-59449 (EMBODIMENT 1) | | | | | | | | | 32 BITS (MINIMUM VALUE) |

| | BURST DATA 0 | BURST DATA 1 | BURST DATA 2 | BURST DATA 3 | BURST DATA 4 | BURST DATA 5 | BURST DATA 6 | BURST DATA 7 | TRANSITION COUNT |
|---|---|---|---|---|---|---|---|---|---|
| ORDER CHANGING TABLE 0 | 000000FF | F000000F | FF000000 | FFF00000 | 0FFF0000 | 00FFF000 | 000FFF00 | 0000FFF0 | 52 BITS |
| | 8BITS | 8BITS | 4BITS | 8BITS | 8BITS | 8BITS | 8BITS | | |
| ORDER CHANGING TABLE 1 | FFE00000 | FFE00000 | FFE00000 | FFE00000 | FFE00000 | FFE00000 | FFE00000 | FFE00000 | 0 BIT |
| | 0BIT | 0BIT | 0BIT | 0BIT | 0BIT | 0BIT | 0BIT | | |
| JAPANESE PATENT LAID-OPEN NO.2008-59449 (EMBODIMENT 1) | | | | | | | | | 32 BITS (MINIMUM VALUE) |
| | 4BITS | 4BITS | 4BITS | 4BITS | 4BITS | 4BITS | 4BITS | | |

IMAGE PROCESSING APPARATUS AND IMAGE PROCESSING METHOD FOR TRANSFERRING IMAGE DATA

BACKGROUND OF THE INVENTION

Field of the Invention

The present invention relates to an image processing technique and, more particularly, to a technique of transferring image data.

Description of the Related Art

With recent advances in the resolution and image quality of display and projector products, image processing engines are required to perform complicated image processing at high speed. Such a requirement is mainly met by achieving higher integration and higher operating frequency with advances in semiconductor processes. However, an increase in the electromagnetic radiation of an LSI along with an increase in operating frequency makes it difficult to take countermeasures against EMI (Electro Magnetic Interference). EMI hinders the operations of other devices and affects the human body. It is therefore very important to suppress EMI within a reference value.

As one of the countermeasures against EMI, a so-called SSCG (Spread Spectrum Clock Generator) is used. The SSCG has a function of suppressing the peak of EMI by changing the clock frequency of an LSI to cause oscillation (frequency modulation). In addition, attempts have been made to reduce EMI by decreasing the number of signal pins for outputting signals outside the LSI or suppressing the slew rate at the time of the transition of an output signal.

In order to reduce EMI in the above manner, it is important to combine a plurality of countermeasures. Among these techniques, as a technique for more effectively reducing EMI, "memory control circuit and memory control method" disclosed in Japanese Patent Laid-Open No. 2008-59449 has been proposed.

According to Japanese Patent Laid-Open No. 2008-59449, when data constituted by a plurality of bursts is written in a memory, a plurality of data are generated by changing the order of bursts. Among the plurality of generated data, data exhibiting the lowest frequency of data switching is selected, and the order of the bursts of the selected data is stored as redundancy bits in the memory, together with the above data. An attempt is made to reduce EMI by decreasing the number of times of switching of data lines connected to the memory in the above manner. The technique disclosed in Japanese Patent Laid-Open No. 2008-59449, however, has a problem that it needs a memory area for storing redundancy bits representing the order of bursts.

SUMMARY OF THE INVENTION

The present invention has been made in consideration of such a problem, and provides a technique for effectively suppressing EMI noise by suppressing the transition of data lines of a memory without requiring any redundant memory area.

According to the first aspect of the present invention, there is provided an image processing apparatus comprising: an acquisition unit configured to acquire pixel data; a writing unit configured to write the pixel data in a memory; a changing unit configured to change an order of pixel data acquired by the acquisition unit in accordance with a predetermined pattern corresponding to a display mode before writing by the writing unit, the changing unit changing the order of the pixel data to reduce a change amount in bit data in a storage region of the memory when pixel data corresponding to a second predetermined bit count is written in the storage region after pixel data corresponding to a first predetermined bit count is written in the storage region of the memory; and an output unit configured to read out pixel data written in the memory, change the order of the readout pixel data based on the predetermined pattern, and output the readout pixel data whose order is changed based on the predetermined pattern.

According to the second aspect of the present invention, there is provided an image processing method comprising: an acquisition step of acquiring pixel data; a writing step of writing the pixel data in a memory; a changing step of changing an order of pixel data acquired in the acquisition step in accordance with a predetermined pattern corresponding to a display mode before writing in the writing step, wherein the order of the pixel data is changed in the changing step to reduce a change amount in bit data in a storage region of the memory when pixel data corresponding to a second predetermined bit count is written in the storage region after pixel data corresponding to a first predetermined bit count is written in the storage region of the memory; and an output step of reading out pixel data written in the memory, changing the order of the readout pixel data based on the predetermined pattern, and outputting the readout pixel data whose order is changed based on the predetermined pattern.

According to the third aspect of the present invention, there is provided a non-transitory computer-readable storage medium storing a computer program for causing a computer to execute an acquisition step of acquiring pixel data, a writing step of writing the pixel data in a memory, a changing step of changing an order of pixel data acquired in the acquisition step in accordance with a predetermined pattern corresponding to a display mode before writing in the writing step, wherein the order of the pixel data is changed in the changing step to reduce a change amount in bit data in a storage region of the memory when pixel data corresponding to a second predetermined bit count is written in the storage region after pixel data corresponding to a first predetermined bit count is written in the storage region of the memory, and an output step of reading out pixel data written in the memory, changing the order of the readout pixel data based on the predetermined pattern, and outputting the readout pixel data whose order is changed based on the predetermined pattern.

Further features of the present invention will become apparent from the following description of exemplary embodiments (with reference to the attached drawings).

BRIEF DESCRIPTION OF THE DRAWINGS

FIG. 4 is a view showing an example of the arrangement of 7-pixel data;

FIG. 6 is a view showing an example of the arrangement of order changing table 1; and FIG. 7 is a view showing the comparison between the respective bit transition counts.

DESCRIPTION OF THE EMBODIMENTS

The embodiments of the present invention will be described below with respect to the accompanying drawings. Note that each embodiment described below will exemplify a case in which the present invention is specifically carried out, and is a specific example of an arrangement described in the scope of claims.

First Embodiment

Figure 1:
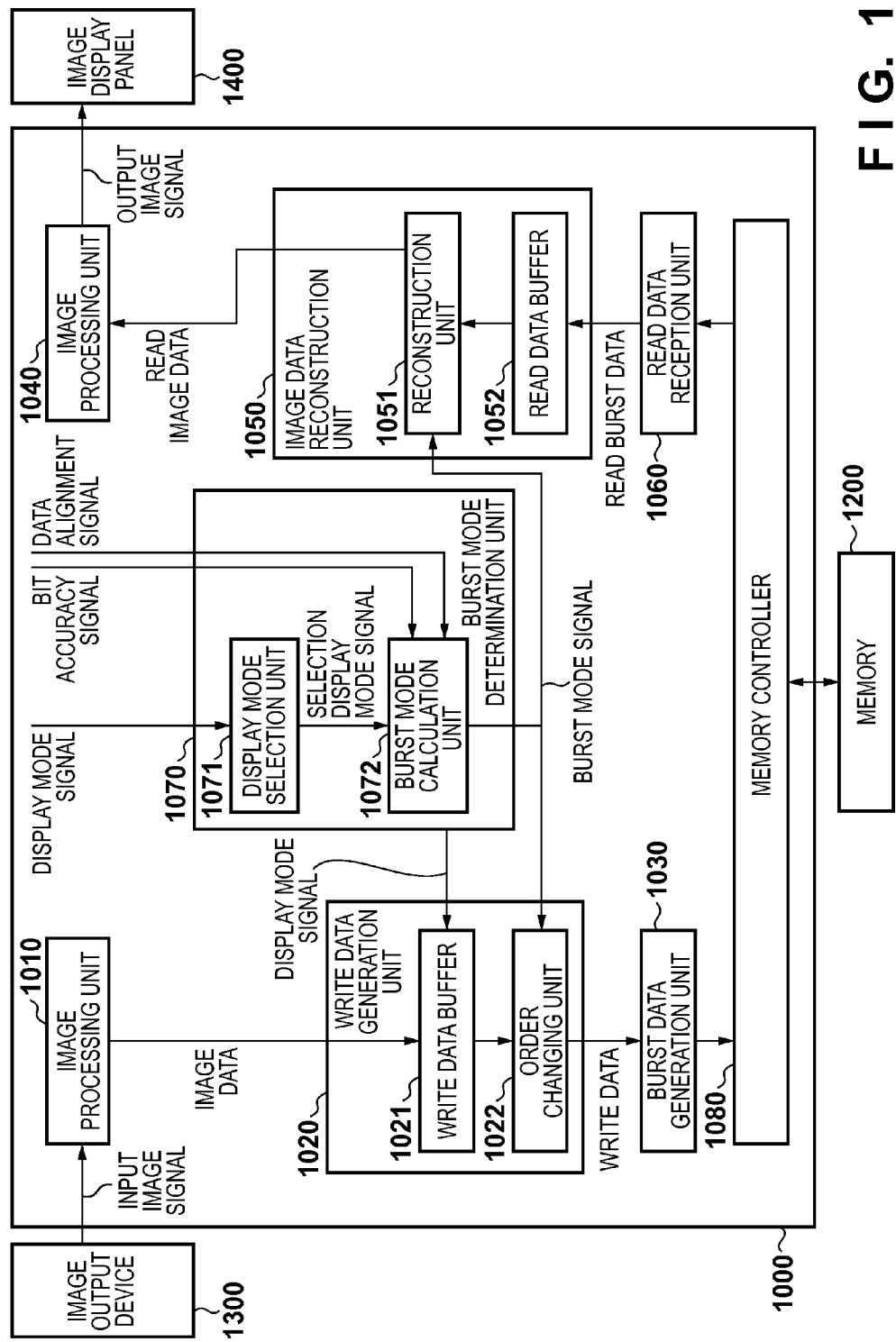
FIG. 1 is a block diagram showing an example of the arrangement of an image processing apparatus 1000.

An example of the arrangement of an image processing apparatus 1000 according to this embodiment will be described first with reference to the block diagram of FIG. 1. An image output device 1300 supplies one image to the image processing apparatus 1000. The image output device 1300 can be any device which can provide images, for example, a memory device which holds images or an image sensing device which can sense a still image or movie. One image input from the image output device 1300 to the image processing apparatus 1000 may be one still image or each frame image constituting a movie. The image processing apparatus 1000 stores the image supplied from the image output device 1300 in a memory 1200 upon processing the supplied image, and outputs the processed image stored in the memory 1200 to an image display panel 1400 upon reading out and processing the image. Although FIG. 1 shows an example of the arrangement of the image processing apparatus 1000 including two image processing units (an image processing unit 1010 and an image processing unit 1040), the number of image processing units is not limited to two and may be three or more. The same applies to a system which superimposes a UI (User Interface) and the like on a video.

Each functional unit constituting the image processing apparatus 1000 will be described in more detail next. A burst mode determination unit 1070 receives a display mode signal, a bit accuracy signal, and a data alignment signal.

A display mode signal is a signal representing a display mode in this apparatus. Assume that in this embodiment, a display mode signal is a signal representing one of a movie mode and a mute mode which has been set. The movie mode represents a normal operation mode of storing, in the memory 1200, an image supplied from the image output device 1300 upon processing the supplied image and outputting the stored processed image to the image display panel 1400 upon reading out and processing the image. In contrast to this, the mute mode is a mode of making the image display panel 1400 display a single-color image on the entire screen to prevent an image disturbed by switching of an input signal or the like from being output or indicate that the apparatus is not abnormal when an input signal is lost. Although the number of signal lines for inputting a display mode signal to the burst mode determination unit 1070 is not limited to 1, the number of signal lines is 1 in this embodiment.

A bit accuracy signal represents the bit count (bit width) of an image input to this apparatus when the image is stored in the memory 1200. If, for example, a bit accuracy signal represents "12", the RGB color image input to the apparatus is stored as a 12-bit RGB color image in the memory 1200.

A data alignment signal is a signal representing a data placement scheme (to be referred to as data alignment hereinafter) for "burst data on an access basis (unit of storage) at the time of storage of data in the memory 1200". There are available schemes for data alignment, including a scheme (to be referred to as a burst alignment scheme hereinafter) of aligning to the bit count of 1-burst data and a scheme (to be referred to as a total alignment scheme hereinafter) of aligning to a bit count corresponding to a burst data count defined by a burst length.

In the burst alignment scheme, image data are placed in one burst data on a pixel basis, and bits corresponding to a shortage in terms of the bit count of the burst data are padded with arbitrary data called padding data.

In the total alignment scheme, pixel data are tightly placed in burst data without any gap, and bits corresponding to a shortage in terms of the burst data count defined by a burst length are finally padded with padding data.

The former scheme has a feature that pixel data positions on burst data are always fixed. The latter scheme has a feature that pixel data positions on burst data are not fixed.

Note that, for example, a display mode signal, a bit accuracy signal, and a data line signal may be set by an internal register and the like using internal signals or may be received as external signals. In this embodiment, these signals are set by the internal register. In addition, in the embodiment, either the movie mode or the mute mode is set as a display mode. However, the modes to be set are not limited to these modes.

Upon receiving a display mode signal, a display mode selection unit 1071 sends out the display mode signal intact as a selection display mode signal to a burst mode calculation unit 1072 on the subsequent stage. Note that when a plurality of display mode signals are input to the display mode selection unit 1071, the unit may select one of them and output the selected signal as a selection display mode signal. This selection may be based on a user's instruction or may performed by the display mode selection unit 1071 depending on the situation.

The burst mode calculation unit 1072 decides a burst mode from a selection display mode signal, a bit accuracy signal, and a data alignment signal, and outputs a burst mode signal as a signal representing the decided burst mode to a order changing unit 1022 and a reconstruction unit 1051. The burst mode represents a condition group constituted by conditions respectively represented by the selection display mode signal, the bit accuracy signal, and the data alignment signal, and is used to decide a table to be referred to by the order changing unit 1022 and the reconstruction unit 1051 when changing the order.

The image processing unit 1010 processes an image (input image signal) supplied from the image output device 1300 and sends out the processed image to a write data generation unit 1020.

If the display mode signal sent out from the burst mode determination unit 1070 indicates the "movie mode", a control unit (not shown) of the write data generation unit 1020 stores the image received from the image processing apparatus 1000 in a write data buffer 1021. If the display mode signal sent out from the burst mode determination unit 1070 indicates the "mute mode", the control unit (not shown) of the write data generation unit 1020 converts the image received from the image processing apparatus 1000 into a single-color image (for example, a blue image). The control unit (not shown) of the write data generation unit 1020 stores this converted single-color image in the write data buffer 1021.

The order changing unit 1022 changes the order of the respective elements constituting the image data stored in the write data buffer 1021 by using the table corresponding to the burst mode signal sent out from the burst mode calculation unit 1072. The order changing unit 1022 sends out this image data obtained by changing the order of the respective elements as write data to a burst data generation unit 1030. The details of the order changing unit 1022 will be described later.

The burst data generation unit 1030 manages the write data received from the order changing unit 1022 on a burst data basis and transfers the data to a memory controller 1080 for each number of burst data corresponding to a predetermined burst length.

The memory controller 1080 stores the data transferred from the burst data generation unit 1030 in the memory 1200, and sends out the burst data requested from a read data reception unit 1060 to the read data reception unit 1060 upon reading out the data from the memory 1200.

The read data reception unit 1060 stores the burst data sent out from the memory controller 1080 as read burst data in a read data buffer 1052 in an image data reconstruction unit 1050.

The reconstruction unit 1051 changes the order of the data stored in the read data buffer 1052 in a reverse manner to that in which the order changing unit 1022 has changed the order, by using the table corresponding to the burst mode signal sent out from the burst mode calculation unit 1072. With this operation, the reconstruction unit 1051 reconstructs the image data in which the elements are placed in the order before changing the order by the order changing unit 1022.

The image processing unit 1040 processes the image reconstructed by the reconstruction unit 1051, and outputs the processed image as an output image signal to the image display panel 1400.

The order changing unit 1022 will be described in detail next. An example of the arrangement of the order changing unit 1022 will be described first with reference to the block diagram of FIG. 2. For a concrete description of the order changing unit 1022, assume that the burst length is 8, the burst data width is 32 bits, the image data format is RGB, the bit accuracy signal is 12 bits, and the data alignment signal indicates the total alignment scheme. Note that the maximum pixel count which can be stored in a total bit count of 256 corresponding to a burst length of 8 is 7 (252 bits). In this case, therefore, 4 padding bits are inserted.

Figure 2:
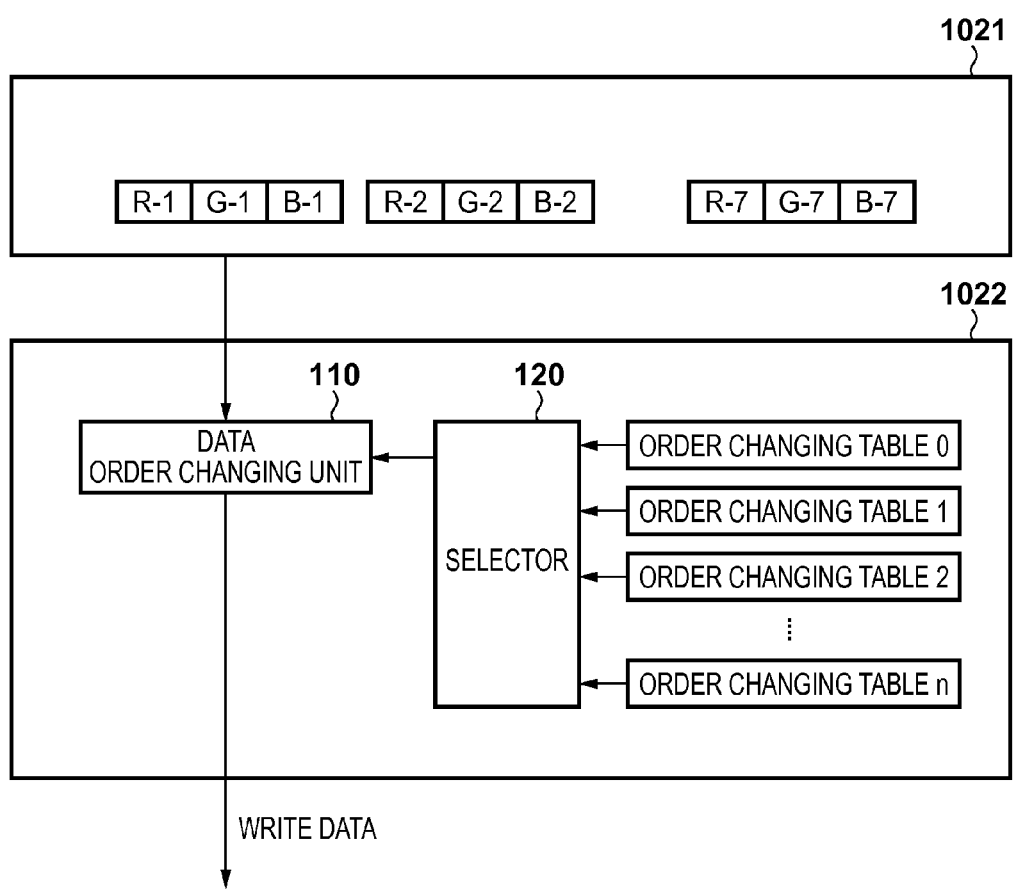
FIG. 2 is a block diagram showing an example of the arrangement of a order changing unit 1022.

In this case, as shown in FIG. 2, the image processing unit 1010 inputs the R component pixel values, G component pixel values, and B component pixel values of 7 pixels (pixels 1 to 7) to the order changing unit 1022. These pixel values are then stored in the write data buffer 1021. For example, R-1, G-1, and B-1 respectively represent the R component pixel value, G component pixel value, and B component pixel value of pixel 1, and R-7, G-7, and B-7 respectively represent the R component pixel value, G component pixel value, and B component pixel value of pixel 7.

Tables (order changing tables) corresponding to various burst mode signals are registered in the order changing unit 1022. Referring to FIG. 2, (n+1) order changing tables (order changing tables 0 to n) are registered.

One order changing table stores changing the order patterns each having a length corresponding to the number of bits stored in burst data having a set burst length. Each order changing table describes the correspondence relationship between the respective bits in burst data constituting the write data generated by the burst data generation unit 1030 and the respective bits in an image stored in the write data buffer 1021. That is, the correspondence relationship between bits is registered in each order changing table to make it possible to specify one of bit groups before changing the order to which the bits after changing the order based on the order changing table correspond.

In this embodiment, a burst mode signal indicates either a 12-bit total alignment movie mode or a 12-bit total alignment mute mode. In this case, a order changing table corresponding to the 12-bit total alignment movie mode and a order changing table corresponding to the 12-bit total alignment mute mode are registered in the order changing unit 1022. In addition, each order changing table contains the above padding bit information.

Upon receiving a burst mode signal from the burst mode calculation unit 1072, a selector 120 selects a order changing table corresponding to the burst mode signal and sends out the table to a data order changing unit 110.

The data order changing unit 110 changes the order of the data of 7 pixels stored in the write data buffer 1021 in accordance with the order changing table selected by the selector 120, and outputs the order-changed data as write data to the burst data generation unit 1030.

Figure 4:
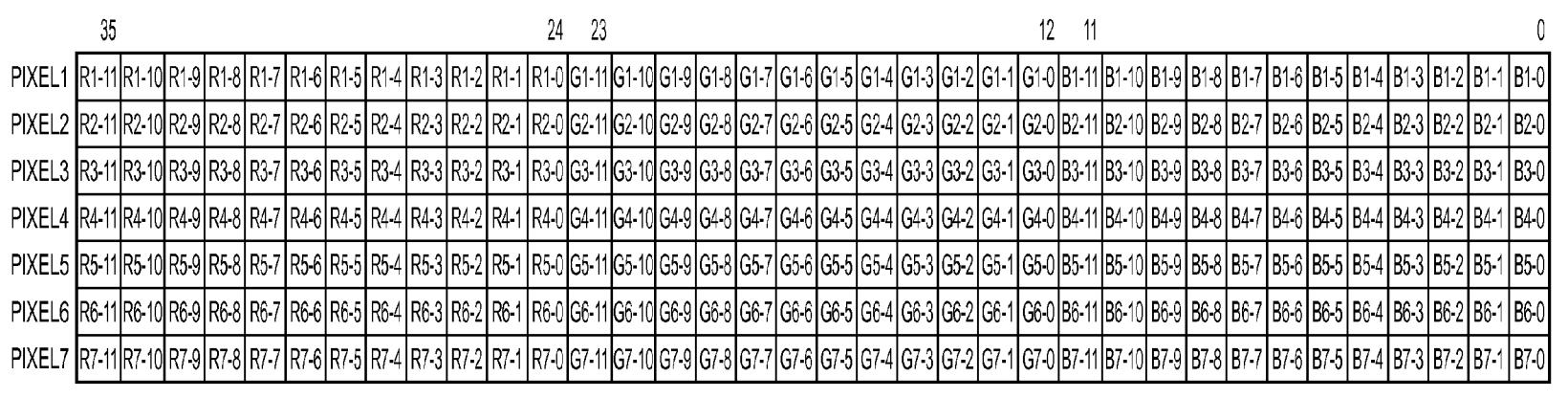

FIG. 4 shows an example of the arrangement of the 7-pixel data stored in the write data buffer 1021. Rm-n represents the R component nth bit pixel value of a pixel m, Gm-n represents the G component nth bit pixel value of the pixel m, and Bm-n represents the B component nth bit pixel value of the pixel m. Note that when n=11, it indicates the MSB.

The first row (pixel 1) in FIG. 4 represents the data of pixel 1, with R, G, and B being respectively represented by 12-bit bit groups (R1-11 to R1-0, G1-11 to G1-0, and B1-11 to B1-0). Likewise, the second to seventh rows (pixels 2 to 7) respectively represent the data of pixels 2 to 7, with R, G, and B being respectively represented by 12-bit bit groups.

Figure 5:
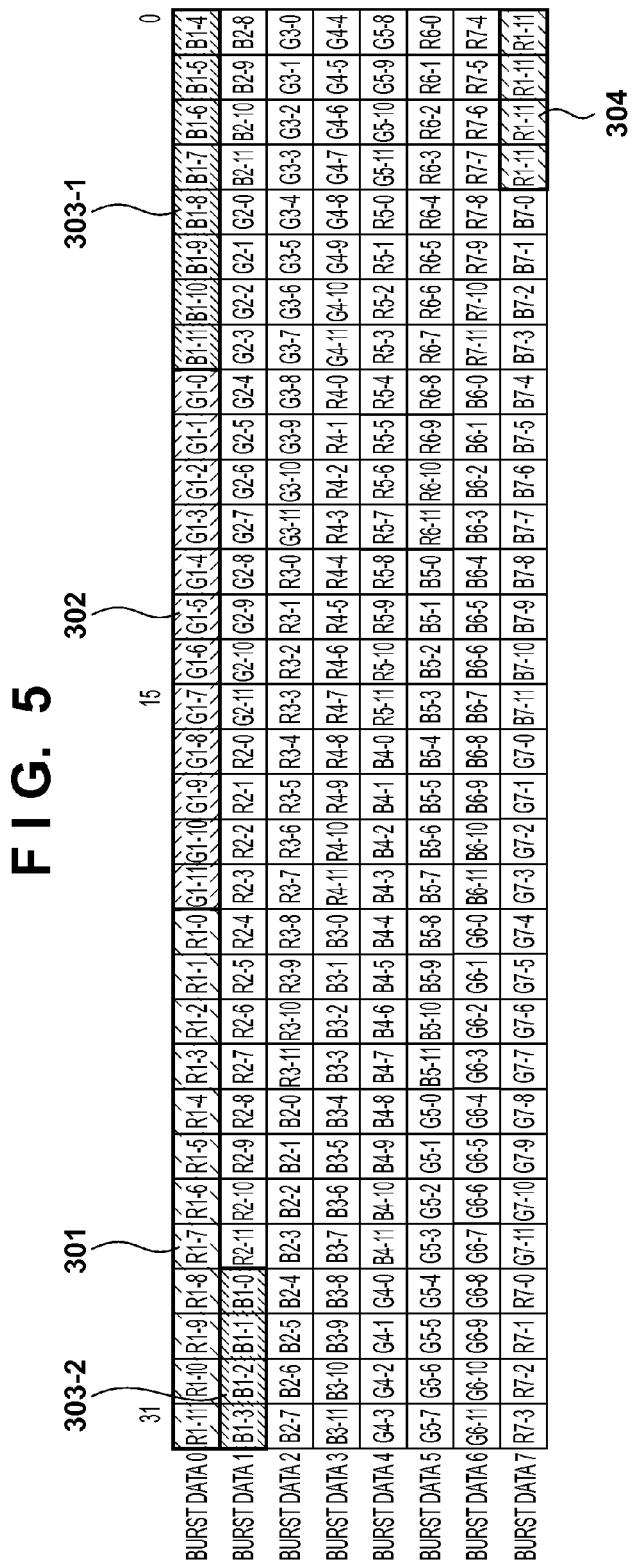
FIG. 5 is a view showing an example of the arrangement of order changing table 0.

FIG. 5 shows an example of the arrangement of a order changing table (order changing table 0) corresponding to the 12-bit total alignment movie mode. Order changing table 0 is configured to place the bits of 36-bit wide pixel data into those of 32-bit wide burst data by 12-bit total alignment. Note that this bit placement is also a conventional technique.

Each row corresponds to burst data, and each column corresponds to each bit of burst data. Pixel 1 contains an R component 301, a G component 302, and B components 303-1 and 303-2. The bit width per pixel is 36. In contrast, the bit width of burst data is 32. For this reason, the data of one pixel is stored upon being divided into two burst data. Note that the MSB of the R components of pixel 1 are stored in padding bits 304.

Figure 6:
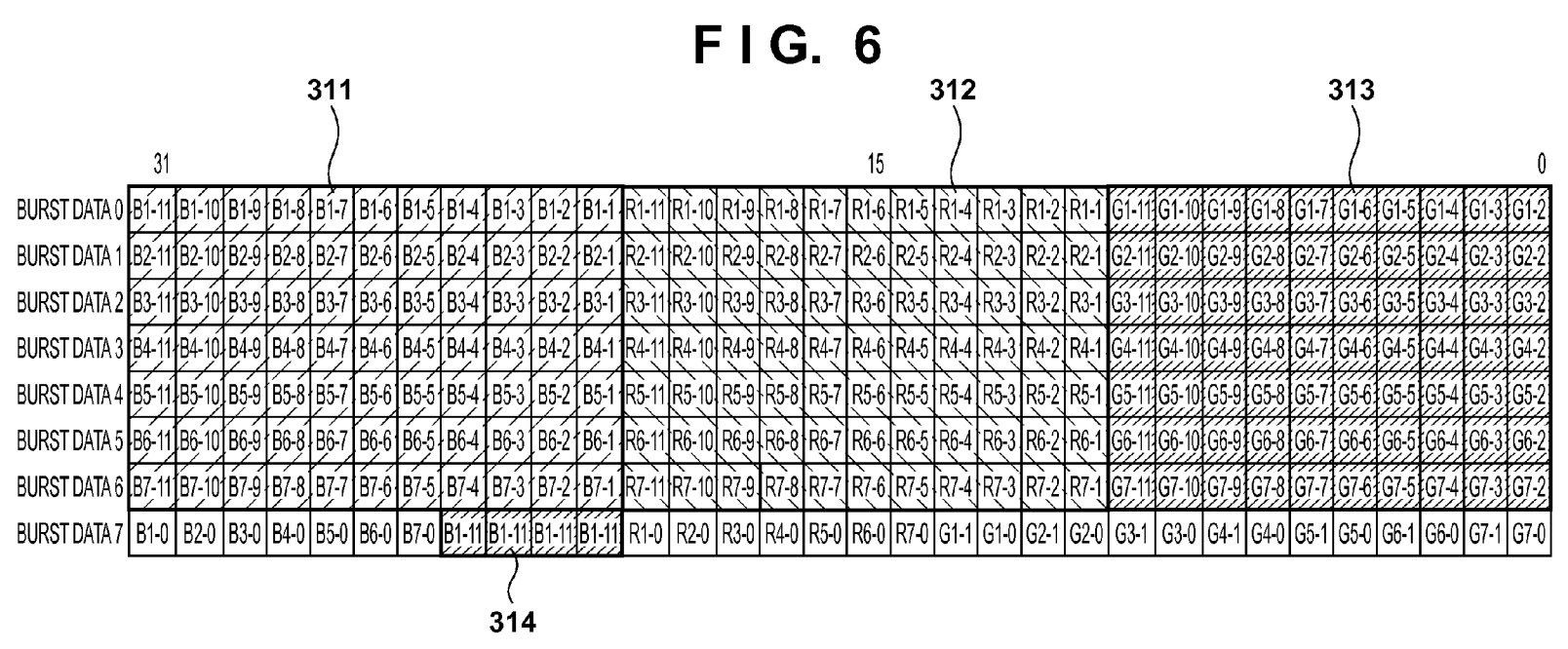

FIG. 6 shows an example of the arrangement of a order changing table (order changing table 1) corresponding to the 12-bit total alignment mute mode. In this embodiment, if the display mode signal sent out from the burst mode determination unit 1070 indicates the "mute mode", the image received from the image processing apparatus 1000 is converted into an image (blue image) with R and G component pixel values=0 and B component pixel value="FFF". The table in FIG. 6 corresponds to this mute mode.

In order changing table 1, the 11th bits of B components of burst data 0 to 6 are placed at the most significant bit positions of the respective burst data, and the 10th bits, the 9th bits, . . . , the 1st bits are subsequently placed in the order named (311). Following them, the upper 11 bits of R components and the upper 10 bits of G components are placed (respectively denoted by 312 and 313). In burst data 7, the remaining bits of R, G, and B components are placed. In addition, padding bits are placed in the bits denoted by 314, and each bit is padded with the MSB of the B component of pixel 1. No data transition occurs when the burst data (write burst data) generated by the burst data generation unit 1030 from write data whose order has been changed by using order changing table 1 are written in the same bursts in the memory 1200.

FIG. 7 shows the comparison in bit transition count between write burst data generated from an image for mute display by using order changing table 0 and order changing table 1. The bit transition count in the related art is indicated by the row corresponding to order changing table 0, and the effect of this embodiment is indicated by the row corresponding to order changing table 1. Note that FIG. 7 also shows the effect of Example 1 described in Japanese Patent Laid-Open No. 2008-59449. Note that the transition count in Japanese Patent Laid-Open No. 2008-59449 is the minimum value (ideal value) at the time of application of Example 1. As shown in FIG. 7, obviously, it is possible to suppress the bit transition count of data by applying this embodiment.

As described above, according to this embodiment, it is possible to decrease the bit transition count of data which occurs in memory write and read operations without using any redundancy bit. This can effectively reduce EMI noise and SSO noise, thereby reducing the power consumption required for memory access. Note that this embodiment includes one burst mode determination unit, but may include a plurality of burst mode determination units.

In addition, the arrangement described above is a merely example, and a merely example of the exemplified arrangement described by detailed examples. That is, the image processing apparatus according to this embodiment has merely exemplified an image processing apparatus having the following basic arrangement.

The basic arrangement is configured to change the order of the respective elements constituting image data in accordance with the order specified by a designated operation mode and transfer the resultant data to a memory according to a predetermined transfer unit. The respective elements constituting the data transferred to the memory are then processed upon being changed to the order before changing the order according to the predetermined order.

Second Embodiment

An example of the arrangement of an image processing apparatus 3000 according to this embodiment will be described with reference to the block diagram of FIG. 3. The same reference numerals as in FIG. 1 denote the same functional units in FIG. 3, and a description of the functional units will be omitted. Mainly differences from the first embodiment will be described below, and the other contents are the same as those in the first embodiment unless otherwise specified.

In this embodiment, as in the first embodiment, the burst length is 8, the burst data width is 32 bits, the image data format is RGB, the bit accuracy signal is 12 bits, and the data alignment signal indicates the total alignment scheme. Note that the maximum pixel count which can be stored in a total bit count of 256 corresponding to a burst length of 8 is 7 (252 bits). In this case, therefore, 4 padding bits are inserted.

An image analysis unit 3090 decides a display mode by analyzing the image processed by an image processing unit 1010. For example, the image analysis unit 3090 extracts the histogram data of each of the R, G, and B components of an image. The image analysis unit 3090 then determines whether the histogram data satisfies both conditions that each of the R, G, and B components contained in the histogram data falls within a predetermined range centered on a corresponding mode, and that the difference between the mode of the B component and the mode of the R and G components is larger than a predetermined value. If this determination result indicates that both the conditions are satisfied, the image analysis unit 3090 decides the mute mode as a display mode; otherwise, the image analysis unit 3090 decides the movie mode as a display mode. The image analysis unit 3090 then sends out a signal representing the decided display mode as a display mode signal (display mode 2 signal) to a display mode selection unit 1071.

Like the display mode selection unit 1071, a display mode selection unit 3071 receives a display mode signal (a display mode 1 signal in this case), a bit accuracy signal, and a data alignment signal, together with the display mode 2 signal from the image analysis unit 3090. If either the display mode 1 signal or the display mode 2 signal indicates the mute mode, the display mode selection unit 3071 determines that the mute mode is designated. If neither of the signals indicates the mute mode, the display mode selection unit 3071 determines that the movie mode is designated. Subsequently, as in the first embodiment, a burst mode is decided, and a signal indicating the decided burst mode is output as a burst mode signal.

As described above, in this embodiment, as in the first embodiment, it is possible to suppress the bit transition count of data. Note that the image analysis method to be used in the image analysis unit 3090 is not limited to the above method, or a plurality of image analysis units may be provided to decide a display mode by performing image analysis.

As described above, according to this embodiment, it is possible to decrease the bit transition count of data which occurs in memory write and read operations without using any redundancy bit. This can effectively reduce EMI noise and SSO noise, thereby reducing the power consumption required for memory access.

In addition, this embodiment is configured to determine a display mode in accordance with an image as well as by setting in the internal register. It is therefore possible to reduce EMI noise and SSO noise even when a mute signal is input from an external reproduction device. In addition, it is conceivable to change the order of data inside a memory controller.

Figure 3:
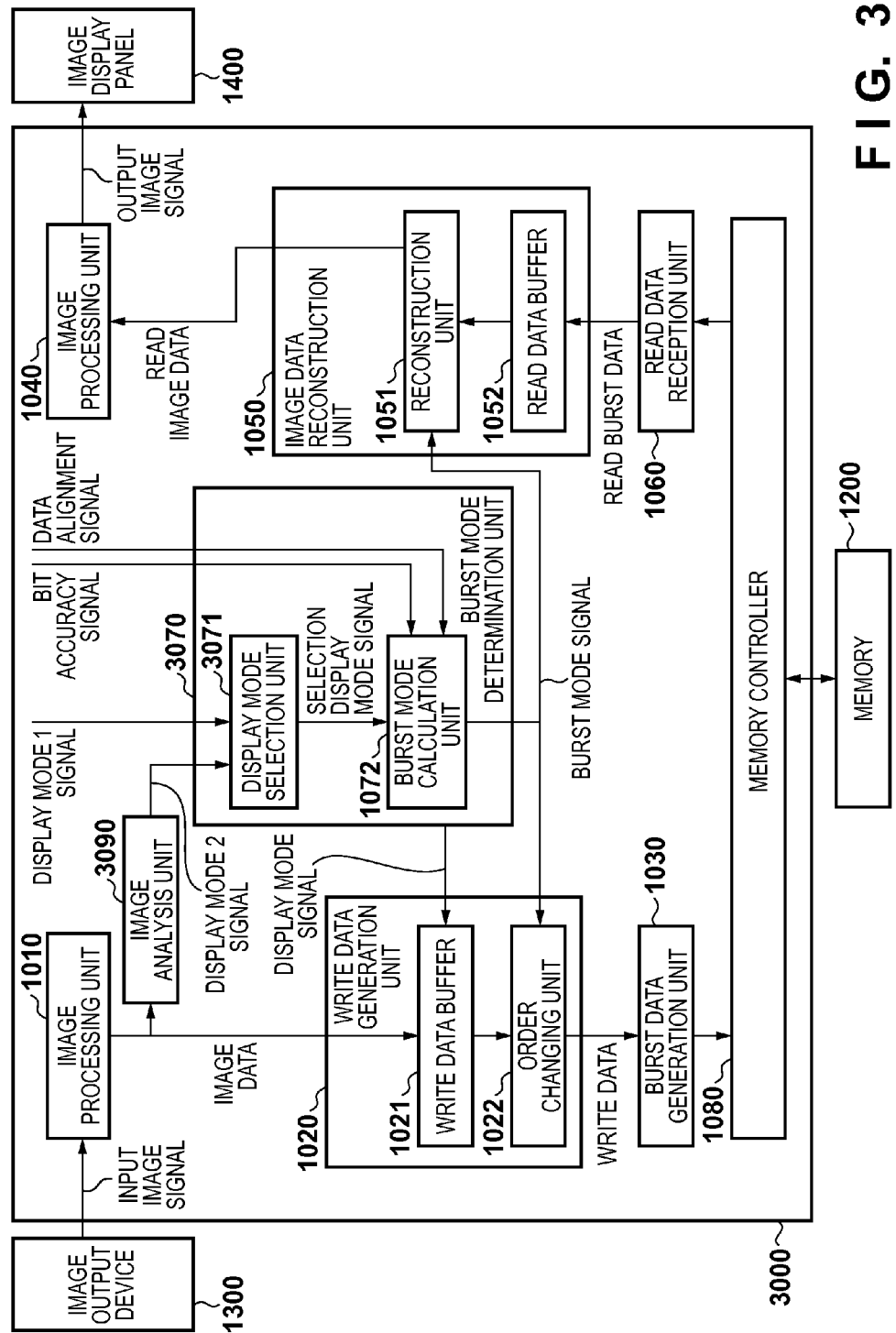
FIG. 3 is a block diagram showing an example of the arrangement of an image processing apparatus 3000.

Furthermore, each functional unit shown in FIGS. 1 and 3 may be implemented by either hardware or software or a combination of hardware and software. When a processor (not shown) executes each functional unit implemented as software, a corresponding function can be implemented.

The arrangement according to the present invention can effectively suppress EMI noise by suppressing the transition of data lines of a memory without requiring any redundant memory area.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-013640, filed Jan. 28, 2014 which is hereby incorporated by reference herein in its entirety.

What is claimed is:

1. An image processing apparatus comprising:
one or more hardware processors configured to cause the image processing apparatus to:
acquire image data,
determine first information related to a data amount corresponding to one pixel of the acquired image data, second information related to a data amount corresponding to a writing unit of a memory into which the acquired image data is written, and third information related to a designated display mode,
determine a change pattern of an order of bit data of the acquired image data such that bit data corresponding to the data amount indicated by the second information among bit data of a first pixel is written into the memory, bit data of a second pixel is written into the memory, and after that, remaining bit data of the first pixel is written into the memory in a case where the data amount indicated by the first information is larger than the data amount indicated by the second information, and the display mode indicated by the third information is a mute mode,
change an order of bit data of the acquired image data in accordance with the determined change pattern, and
read out image data written in the memory, change the order of bit data of the readout image data based on the determined change pattern, and output the bit data whose order is changed based on the determined change pattern.

2. The apparatus according to claim 1, wherein the one or more hardware processors are further configured to cause the image processing apparatus to perform image processing for the readout image data.

3. The apparatus according to claim 1, wherein the display mode is selected from a first mode of displaying a video corresponding to an externally acquired video signal and the mute mode of displaying a predetermined image which does not change with a lapse of time.

4. The apparatus according to claim 3, wherein the display mode is determined by analysis of image data acquired by the image processing apparatus.

5. The apparatus according to claim 1, wherein when the mute mode is set as the display mode, the order of bit data of the image data changes in accordance with the change pattern based on R, G, and B values of a plurality of pixels constituting a predetermined image.

6. The image processing apparatus according to claim 1, wherein a predetermined image whose pixel values of one or more specific color components are 0 and pixel values of a remaining color component are not 0 is displayed in the mute mode.

7. An image processing method comprising:
acquiring image data;
determining first information related to a data amount corresponding to one pixel of the acquired image data, second information related to a data amount corresponding to a writing unit of a memory into which the acquired image data is written, and third information related to a designated display mode,
determining a change pattern of an order of bit data of the acquired image data such that bit data corresponding to the data amount indicated by the second information among bit data of a first pixel is written into the memory, bit data of a second pixel is written into the memory, and after that, remaining bit data of the first pixel is written into the memory in a case where the data amount indicated by the first information is larger than the data amount indicated by the second information, and the display mode indicated by the third information is a mute mode;
changing an order of bit data of the acquired image data in accordance with the determined change pattern; and
reading out image data written in the memory, changing the order of bit data of the readout image data based on the determined change pattern, and outputting the bit data whose order is changed based on the determined change pattern.

8. The method according to claim 7, wherein the display mode is selected from a first mode of displaying a video corresponding to an externally acquired video signal and the mute mode of displaying a predetermined image which does not change with a lapse of time.

9. A non-transitory computer-readable storage medium storing a computer program for causing a computer to execute:
acquiring image data;
determining first information related to a data amount corresponding to one pixel of the acquired image data, second information related to a data amount corresponding to a writing unit of a memory into which the acquired image data is written, and third information related to a designated display mode,
determining a change pattern of an order of bit data of the acquired image data such that bit data corresponding to the data amount indicated by the second information among bit data of a first pixel is written into the memory, bit data of a second pixel is written into the memory, and after that, remaining bit data of the first pixel is written into the memory in a case where the data amount indicated by the first information is larger than the data amount indicated by the second information, and the display mode indicated by the third information is a mute mode;
changing an order of bit data of the acquired image data in accordance with the determined change pattern; and
reading out image data written in the memory, changing the order of bit data of the readout image data based on the determined change pattern, and outputting the bit data whose order is changed based on the determined change pattern.

10. The medium according to claim 9, wherein the display mode is selected from a first mode of displaying a video corresponding to an externally acquired video signal and the mute mode of displaying a predetermined image which does not change with a lapse of time.

\* \* \* \* \*